United States Patent
Lin

(10) Patent No.: US 8,306,346 B2
(45) Date of Patent: Nov. 6, 2012

(54) STATIC IMAGE COMPRESSION METHOD AND NON-TRANSITORY COMPUTER READABLE MEDIUM HAVING A FILE WITH A DATA STRUCTURE

(75) Inventor: Ming-Hung Lin, Taipei (TW)

(73) Assignee: Altek Corporation, Hsinchu (TW)

( * ) Notice: Subject to any disclaimer, the term of this patent is extended or adjusted under 35 U.S.C. 154(b) by 982 days.

(21) Appl. No.: 12/344,834

(22) Filed: Dec. 29, 2008

(65) Prior Publication Data

US 2009/0169121 A1 Jul. 2, 2009

(30) Foreign Application Priority Data

Dec. 28, 2007 (TW) .............................. 96150978 A

(51) Int. Cl.
*G06K 9/36* (2006.01)
(52) U.S. Cl. ....................................................... 382/243
(58) Field of Classification Search ........... 382/232–246
See application file for complete search history.

(56) References Cited

U.S. PATENT DOCUMENTS

| 5,347,266 | A | * | 9/1994 | Bauman et al. | 345/471 |
| 5,485,526 | A | * | 1/1996 | Tobin | 382/232 |
| 5,583,953 | A | * | 12/1996 | Harrington | 382/239 |
| 5,659,737 | A | * | 8/1997 | Matsuda | 707/693 |
| 2001/0023457 | A1 | * | 9/2001 | Tack-don et al. | 709/245 |
| 2003/0091241 | A1 | * | 5/2003 | Morihara et al. | 382/233 |
| 2009/0063825 | A1 | * | 3/2009 | McMillen et al. | 712/220 |

* cited by examiner

*Primary Examiner* — Jingge Wu
(74) *Attorney, Agent, or Firm* — Workman Nydegger

(57) ABSTRACT

A static image compression method, a computer readable data structure, and a computer readable storage medium are described. Firstly, an image is segmented into a plurality of sub-images. Then, each sub-image is sequentially compressed into a sub-data frame having a start character, so as to generate a compressed data with the sub-data frames interconnected according to a sequence of the sub-images. Finally, the addresses of the start characters are recorded to generate an index data. Thereby, the start character of a particular block can be obtained from the index data, and the sub-image of the particular block is preferentially decoded and displayed.

9 Claims, 4 Drawing Sheets

STATIC IMAGE COMPRESSION METHOD AND NON-TRANSITORY COMPUTER READABLE MEDIUM HAVING A FILE WITH A DATA STRUCTURE

CROSS-REFERENCE TO RELATED APPLICATIONS

This non-provisional application claims priority under 35 U.S.C. §119(a) on Patent Application No(s). 096150978 filed in Taiwan, R.O.C. on Dec. 28, 2007 the entire contents of which are hereby incorporated by reference.

BACKGROUND

1. Field of Invention

The present invention relates to an image processing technique, and more particularly to a static image compression method, a computer readable data structure, and a computer readable storage medium.

2. Related Art

In early times, the storage size of a digital image is very huge, and thus problems such as slow processing speed or inconvenience in carrying/transmission usually occur. Therefore, an "image compression technique" appears. Through the technique, the memory taken up by a compressed image is much smaller than the original image file. Besides, the original image can be restored through proper decompression.

To further improve the compression efficiency and space utilization, a "lossy" compression algorithm is put forward. The lossy image compression is developed mainly based on the sensitivity of the human eye, in which luminance details of a digital image are remained, and a large amount of color data is converted into a simpler mode, so as to save the space.

Joint Photographic Experts Group (JPEG) technique is a lossy compression standard method widely applied in image processing within a computer, in which an image is destructively compressed, and cannot be restored exactly after the compression, so the image inevitably has losses. Though a standard of progressive JPEG technique based on the JPEG technique and employing a lossless compression manner is provided, the progressive JPEG technique has not been widely promoted so far.

The JPEG technique adopts the concept of lossy coding. Firstly, an image is segmented into a collection of 8×8 sub-images (i.e., at the size of 8 pixel×8 pixel). Then, discrete cosine transform (DCT) is applied to each sub-image. After that, less important color parts of each sub-image are removed, and only the essential luminance information is remained, so as to achieve a high compression rate.

Skipping some trivial steps, the JPEG technique mainly compresses each sub-image by the following steps. Firstly, the DCT is applied to each sub-image data, and the data of sub-image are then quantized into integer numbers. Next, the quantized two-dimensional (2D) DCT coefficients are converted by zig-zag scan into a one-dimensional (1D) array. Then, the 1D array is coded according to a pre-defined Huffman coding table. The zig-zag scan makes many high-frequency zero values closely adjacent to each other, and the Huffman coding is performed to obtain a better compression rate, especially for consecutively adjacent zero values. Finally, a JPEG file is generated by JPEG syntax. The decompression method uses the inverse procedures to the compression algorithm, but as the quantization process is irreversible, the restored image is different from the original one, thus causing image loss.

However, the compressed image only displays computer readably binary data. The compressed image can not be displayed in the form that is visible and recognizable by human eyes. Thus, a current JPEG file must be completely decompressed in order to know the objects or recognizable content of the image.

As for digital cameras, due to the progressive technology, the images captured by a digital camera have increasingly higher resolution. The resolution gradually develops from the previous one or two mega pixels to nearly ten-mega pixels, and some more sophisticated digital cameras even support more than ten-mega pixels. However, as the pixel value is getting higher and higher, the image size after compression may be still too large. Taking an image with ten-mega pixels for example, the size of a file after compression is still close to 10 megabytes (MB), and the time needed for image processing is directly proportional to the size of the image. Under the circumstance that the content of an image is known only after complete decompression, more time is wasted in waiting for the image to be decompressed to show the actual content. Moreover, when a large number of images are to be processed, it takes plenty of time to browse the images in order to pick-up the desired ones.

SUMMARY OF THE INVENTION

In order to solve the problem in the prior art that the content of a compressed image is able to display to the user only after the whole image is decoded, the present invention is mainly directed to providing a static image compression method, a computer readable data structure, and a computer readable storage medium.

The present invention provides a static image compression method, which includes the following steps: firstly, segmenting an image into a plurality of sub-images; next, sequentially compressing each of the sub-images into a sub-data frame having a start character, so as to generate a compressed data with the sub-data frames interconnected according to the sequence of the sub-images; and then recording addresses of the start characters to generate an index data.

Further, a feature block covering at least one row of the sub-images is defined in the image. Then, after each sub-image is compressed, addresses of the start characters in the sub-data frames formed by the compression of a first and a last sub-image in each row of the sub-images in the feature block are obtained. Afterward, the obtained addresses of the start characters in the compressed data blocks are recorded to form the index data.

In addition, a feature region or a region in which a user is interested is selected from the image by the user or through the analysis of program software, and is defined as a feature block.

The present invention provides a computer readable data structure including a compressed data block and an index data block.

The compressed data block includes a plurality of sub-data frames. The sub-data frames are decompressed into a plurality of sub-images that constitute an image. Each sub-data frame has a start character for initiating the decompression of the sub-data frame.

The index data block includes a plurality of addresses. The addresses are respectively corresponding to one of the start characters, and each represents the position of the corresponding start character in the compressed data block.

Further, the image has a feature block covering at least one row of the sub-images, and the addresses in the index data block respectively represent the positions of the sub-data frames in the compressed data block after the compression of the first and the last sub-image in each row of the sub-images in the feature block.

In addition, the compressed data block and the index data block form two different files. In other words, each of the compressed data and the index data forms a file. Besides, the compressed data block and the index data block may also form a single file.

Further, the formed files may all be stored in a computer readable storage medium.

Therefore, during the decompression, the start character of a sub-data frame to be decompressed is first found through the address of the start character recorded in the index data, such that the sub-data frame is made to be decompressed by the start character. In this manner, several sub-images in the image are obtained, and thus the content of the whole image can be figured out through the obtained sub-images, so as to determine whether the image is desired. Moreover, in some special applications, image decoding and playing can be speeded up. Take projection display for example. According to the present invention, any start character can be obtained through the address thereof recorded in the index data, and a corresponding image is decoded and displayed by the start character. Likewise, other start characters are obtained to decode and display corresponding images. Thereby, the whole image is decoded, and the animation transition effect of the projection is achieved. In brief, the start character of a particular block is obtained from the index data, so as to decode and display the sub-image of the particular block preferentially.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
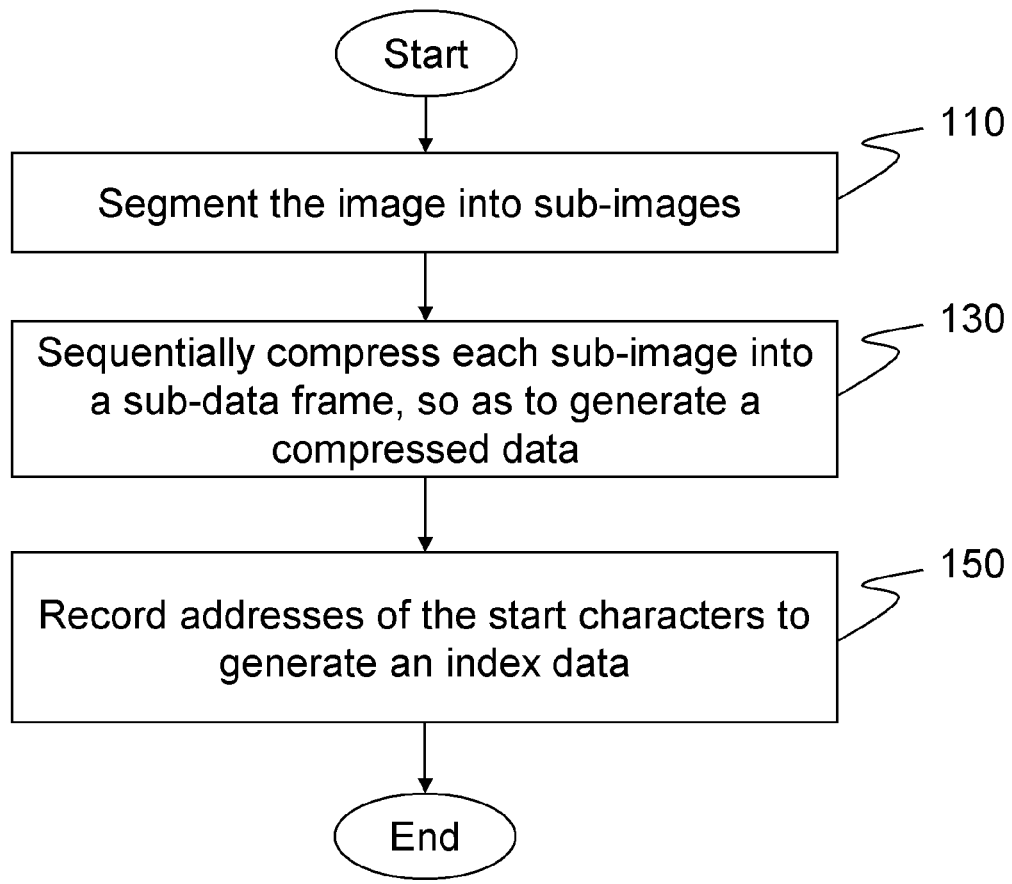
FIG. 1 is a flow chart of a static image compression method according to an embodiment of the present invention.

Referring to FIG. 1, a static image compression method according to an embodiment of the present invention is shown. The static image compression method is used for compressing an image.

Firstly, the image is segmented into a plurality of sub-images (Step 110). Then, each sub-image is sequentially compressed into a sub-data frame to generate a compressed data (Step 130). Each sub-data frame has a start character, for initiating the decompression of the sub-data frame. The sub-data frames are interconnected according to the sequence of the sub-images, so as to form a compressed data. Finally, addresses of the start characters are recorded to generate an index data (Step 150).

Therefore, during the decompression, the compressed data can be directly decompressed to obtain the whole image. Alternatively, the start character of a sub-data frame to be decompressed is first found through the address of the start character recorded in the index data, such that the sub-data frame is made to be decompressed by the start character. In this manner, several sub-images in the image are obtained, and thus the content of the whole image can be figured out through the obtained sub-images, so as to determine whether the image is desired. Moreover, in some special applications, image decoding and playing can be speeded up. Take projection display for example. According to the present invention, any start character can be obtained through the address thereof recorded in the index data, and a corresponding image is decoded and displayed by the start character. Likewise, other start characters are obtained to decode and display corresponding images. Thereby, the whole image is decoded, and the animation transition effect of the projection is achieved. In brief, the start character of a particular block is obtained from the index data, so as to decode and display the sub-image of the particular block preferentially.

The sub-images are compressed by the technology of JPEG

Take an image of 1024×1024 (pixels) for example. The image is segmented by the size of 8×8 (pixel×pixel), to obtain 64×64 sub-images. In other words, the size of each sub-image is 16×16 (pixels). After that, each 16×16 (pixels) sub-image is sequentially compressed.

Figure 2:
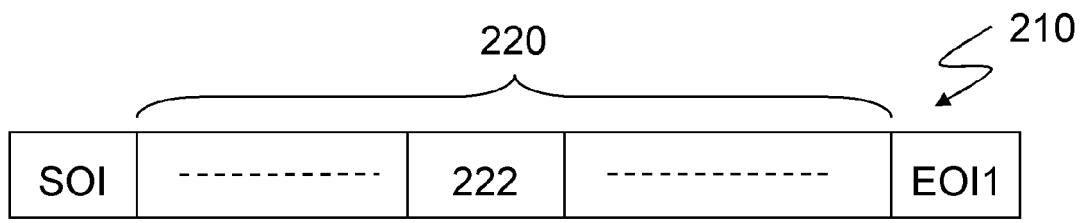
FIG. 2 is a schematic view of a compressed data block in a computer readable data structure according to an embodiment of the present invention.
Figure 3:
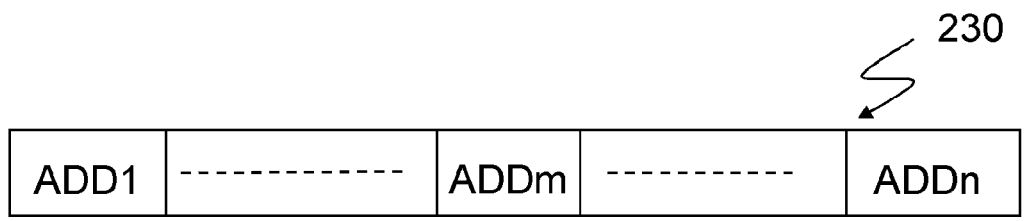
FIG. 3 is a schematic view of an index data block in a computer readable data structure according to an embodiment of the present invention.

Referring to FIGS. 2 and 3, after the image is compressed, the compressed data is located in a compressed data block 210, and the index data is located in an index data block 230.

The compressed data has a header SOI, a data frame 220 after the image compression, and an end character EOI1. The index data has multiple addresses ADD1-ADDm-ADDn.

Figure 4:
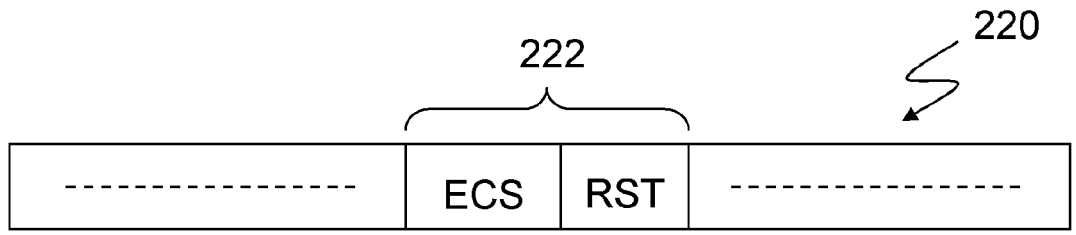
FIG. 4 is a schematic view of a sub-data frame in a computer readable data structure according to an embodiment of the present invention.

Referring to FIGS. 3 and 4, the data frame 220 has multiple sub-data frames 222, and each sub-data frame 222 can be decompressed into a sub-image. In other words, the number of sub-data frames 222 obtained after image compressing (coding) is equal to the number of the sub-images segmented from the image. Each sub-data frame 222 mainly has an entropy-coded segment ECS and a start character RST. The entropy-coded segment ECS is a data after the sub-image is compressed. That is, the entropy-coded segment ECS can be decompressed (decoded) into a sub-image. The start character RST is corresponding to the entropy-coded segment ECS located in the same sub-data frame 222, for initiating the decompression of the entropy-coded segment ECS to obtain a sub-image. In other words, each sub-data frame 222 is made to be decompressed by the start character RST thereof.

The addresses ADD1-ADDm-ADDn recorded in the index data are respectively corresponding to one of the start characters RST, and each represents the position of the corresponding start character RST in the compressed data block 210. That is, the start characters RST corresponding to the addresses ADD1-ADDm-ADDn can be obtained from the compressed data block 210 through the addresses ADD1-

ADDm-ADDn in the index data, and thus the sub-data frames 222 can be decompressed by the obtained start characters RST.

In addition, the compressed data block 210 and the index data block 230 form two different files. In other words, each of the compressed image data and the index data forms an individual file.

Further, the compressed data block 210 and the index data block 230 may also form a single file. That is, the compressed data block 210 is connected to the index data block 230, such that the compressed data and the index data are integrated into one file. In the file, the index data block 230 is connected behind the compressed data block 210, i.e., the index data is connected succeeding the compressed data. Alternatively, the compressed data block 210 is connected behind the index data block 230, i.e., the compressed data is connected succeeding the index data.

Figure 5:
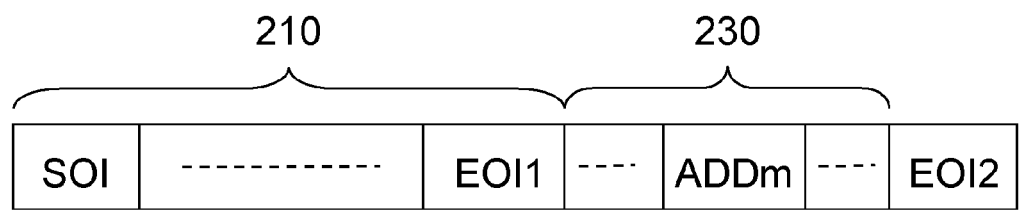
FIG. 5 is a schematic view of a computer readable data structure according to another embodiment of the present invention.

Referring to FIG. 5, when the index data is connected succeeding the compressed data, a file end character EOI2 is inserted behind the index data block 230. The file end character EOI2 is connected behind the index data to serve as an identifier indicating the end of the file.

In addition, the formed files may all be stored in a computer readable storage medium, for example but not limited to, memory card, hard disk, flash disk, optical disk, or magnetic disk.

Figure 6:
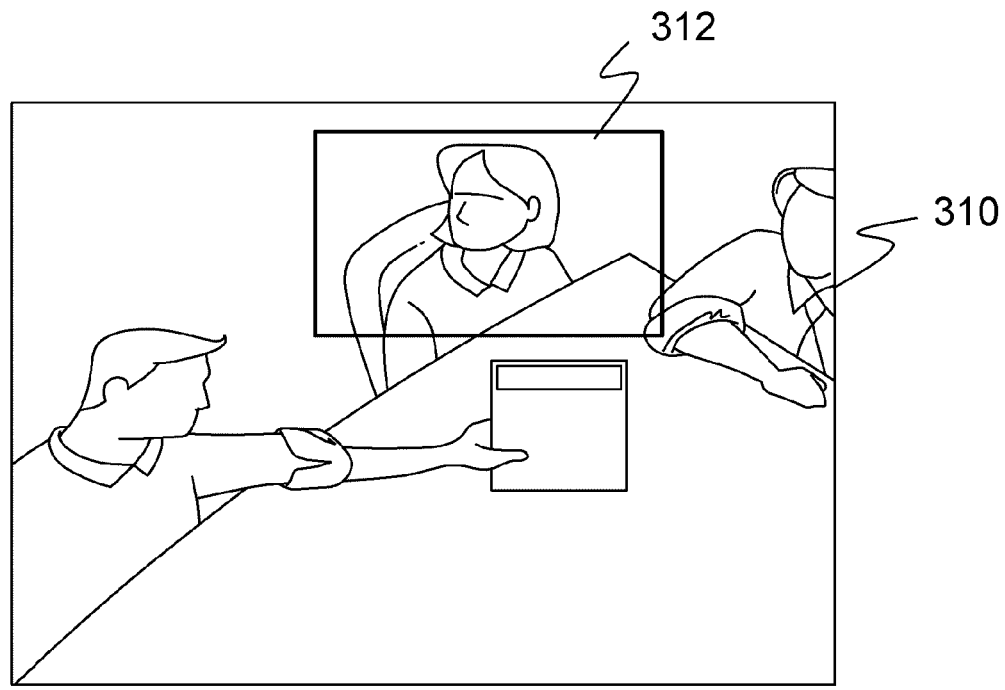
FIG. 6 is a schematic view of a feature block in a static image compression method according to an embodiment of the present invention.
Figure 7:
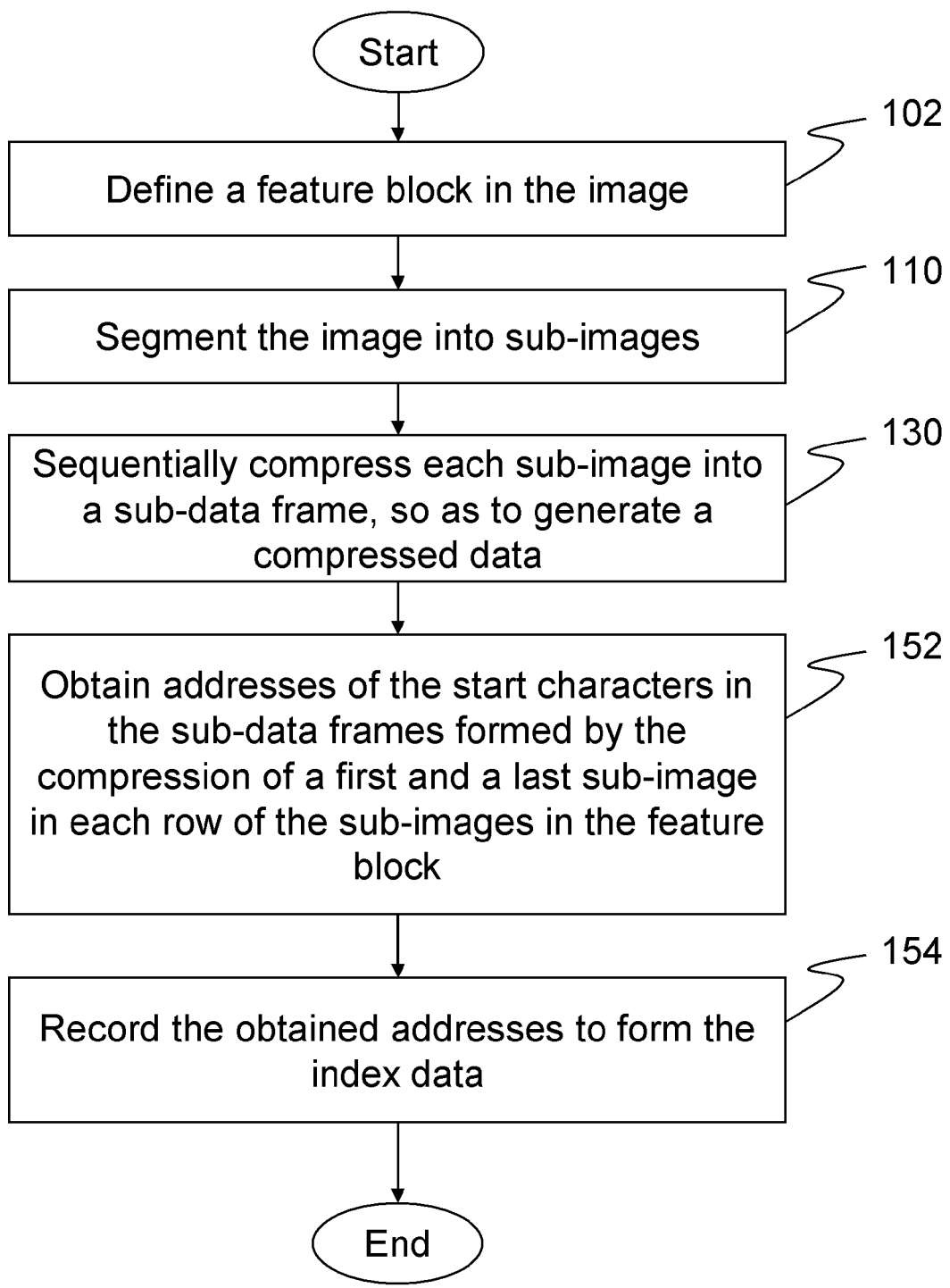
FIG. 7 is a flow chart of a static image compression method according to another embodiment of the present invention.
Figure 8:
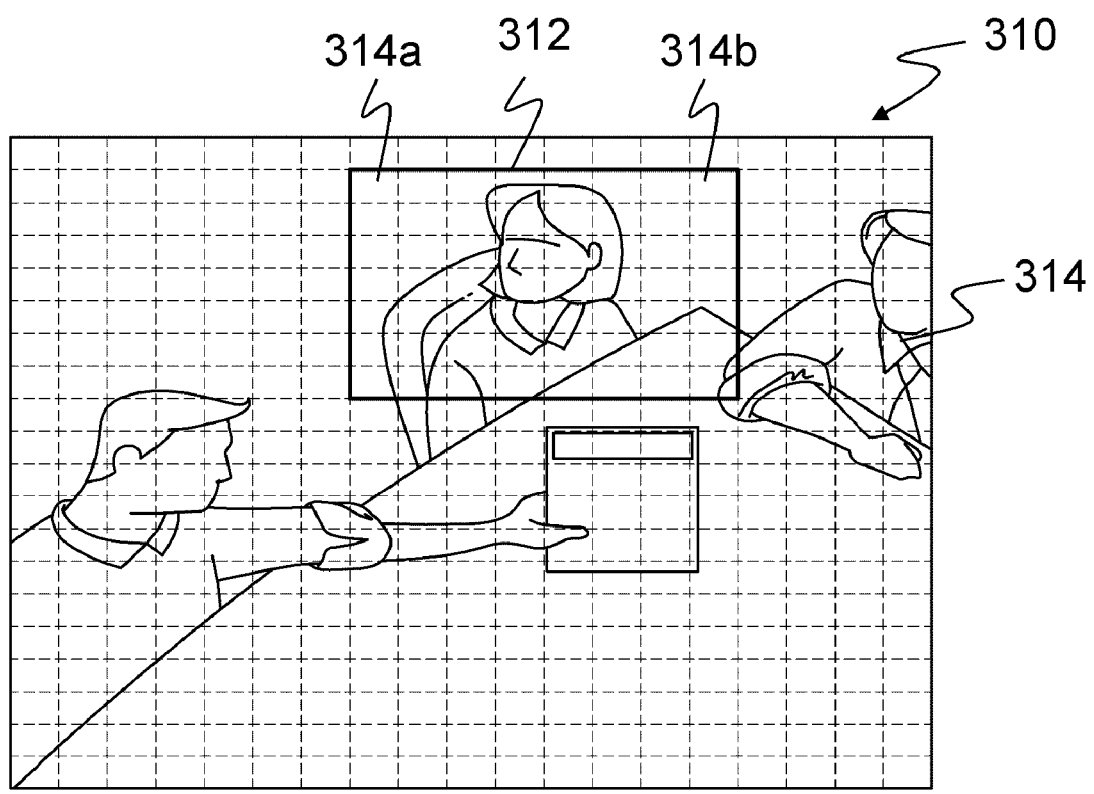
FIG. 8 is a schematic view of a sub-image in a static image compression method according to an embodiment of the present invention.

Continue referring to FIG. 6. Before an image 310 is compressed, a feature region or a region in which a user is interested is selected from the image 310 by the user or through the analysis of program software, and is defined as a feature block 312 (Step 102), as shown in FIG. 7. Next, the image 310 is segmented into a plurality of sub-images 314 (Step 110), and the feature block 312 covers at least one row of the sub-images 314, as shown in FIG. 8. Then, each sub-image 314 is sequentially compressed into a sub-data frame to generate a compressed data (Step 130). The sub-data frames are interconnected according to the sequence of the sub-images 314, so as to form a compressed data. Further, the addresses of the start characters in the sub-data frames 222 formed by the compression of a first sub-image 314a and a last sub-image 314b in each row of the sub-images 314 in the feature block 312 are obtained (Step 152), and the obtained addresses are recorded to form an index data (Step 154).

Before the image is completely decompressed, the start characters are obtained through the addresses thereof recorded in the index data, and are sequentially arranged into pairs, wherein the decompression is first initiated by one start character and then by the other in each pair, so as to sequentially decode each row of the sub-images in the feature block, thereby obtaining the image of the whole feature block. As such, the content of the image can be figured out through the feature block. Thus, the time spent on image preview and searching is shortened, and the desired image can be quickly found. Further, in some special applications, image decoding and playing can be speeded up. Take projection display for example. Through the present invention, the feature block is first decoded and displayed, and then other parts are decoded and displayed, so as to achieve the animation transition effect of the projection.

What is claimed is:

1. A static image compression method, for compressing an image, comprising:
    segmenting the image into a plurality of sub-images;
    defining a feature block in the image, wherein the feature block covers at least one row of at least some of the sub-images;
    sequentially compressing each of the sub-images into a sub-data frame having a start character, so as to generate a compressed data with the sub-data frames interconnected according to a sequence of the sub-images; and
    recording addresses of the start characters to generate an index data, comprising:
        obtaining addresses of the start characters in the sub-data frames formed by the compression of a first and a last sub-image in each row of the sub-images in the feature block; and
        recording the obtained addresses to form the index data.

2. The static image compression method as claimed in claim 1, further comprising:
    connecting the compressed data with the index data to form an image file.

3. The static image compression method as claimed in claim 2, wherein the step of connecting the compressed data with the index data to form the image file further comprises:
    connecting the index data behind the compressed data; and
    setting a file end character behind the index data, so as to form the image file.

4. The static image compression method as claimed in claim 1, further comprising:
    analyzing the image to define the feature block in the image, wherein the feature block covers at least one row of the sub-images; and
    wherein the step of recording the addresses of the start characters to generate the index data further comprises:
        obtaining the addresses of the start characters in the sub-data frames formed by the compression of the first and the last sub-image in each row of the sub-images in the feature block; and
        recording the obtained addresses to form the index data.

5. A non-transitory computer readable medium having a file with a data structure, the data structure, comprising:
    a compressed data block, comprising:
        a plurality of sub-data frames, for being decompressed into a plurality of sub-images that constitute an image, each of the sub-data frames comprising:
            a start character, for initiating the decompression of the sub-data frame; and
        an index data block, comprising:
            a plurality of addresses, respectively corresponding to one of the start characters, each representing the position of the corresponding start character in the compressed data block; and
    wherein the image has a feature block covering at least one row of at least some of the sub-images, and the addresses respectively represent the positions of the sub-data frames in the compressed data block after the compression of a first and a last sub-image in each row of the sub-images in the feature block.

6. The non-transitory computer readable medium having the file with the data structure as claimed in claim 5, wherein the compressed data block is connected to the index data block.

7. The non-transitory computer readable medium having the file with the data structure as claimed in claim 6, wherein the index data block is connected after the compressed data block.

8. The non-transitory computer readable medium having the file with the data structure as claimed in claim 7, further comprising a file end character connected behind the index data block.

9. The non-transitory computer readable medium having the file with the data structure as claimed in claim 6, wherein the compressed data block is connected behind the index data block.

* * * * *